United States Patent
Hirata et al.

[11] Patent Number: 5,247,305
[45] Date of Patent: Sep. 21, 1993

[54] RESPONDER IN MOVABLE-OBJECT IDENTIFICATION SYSTEM

[75] Inventors: Tatsuya Hirata, Ichinomiya; Yoshiyuki Kago, Nishio, both of Japan

[73] Assignee: Nippondenso Co., Ltd., Kariya, Japan

[21] Appl. No.: 918,123

[22] Filed: Jul. 23, 1992

Related U.S. Application Data

[63] Continuation of Ser. No. 774,255, Oct. 10, 1991, abandoned.

[30] Foreign Application Priority Data

Oct. 10, 1990 [JP] Japan .................................. 2-273039
Nov. 26, 1990 [JP] Japan .................................. 2-321474

[51] Int. Cl.$^5$ ............................................. G01S 13/74
[52] U.S. Cl. ...................................................... 342/44
[58] Field of Search ............................. 342/42, 44, 50

[56] References Cited

U.S. PATENT DOCUMENTS

| 4,068,232 | 1/1978 | Meyers et al. | 342/44 |
| 4,358,765 | 11/1982 | Henoch et al. | 342/44 |
| 4,724,427 | 2/1988 | Carroll | 342/44 X |

FOREIGN PATENT DOCUMENTS

| 254954 | 2/1988 | European Pat. Off. |
| 301127 | 2/1989 | European Pat. Off. |
| 323011 | 7/1989 | European Pat. Off. |
| 0324564 | 7/1989 | European Pat. Off. |

*Primary Examiner*—T. H. Tubbesing
*Attorney, Agent, or Firm*—Cushman, Darby & Cushman

[57] ABSTRACT

A movable-object identification system includes an interrogator for transmitting an interrogation signal, and a responder mounted on a movable object for transmitting a reply signal in response to the interrogation signal. The reply signal contains identification information. The responder includes an antenna for receiving the interrogation signal from the interrogator and for radiating the reply signal; and an input device connected to the antenna for receiving an electric power of the interrogation signal received by the antenna. The input device includes a receiving element for dividing the received electric power into a first separation electric power and a second separation electric power corresponding to a traveling and reflected wave of the interrogation signal, respectively. The receiving element has an impedance. The responder further includes a generating device for generating predetermined identification information using the first separation electric power; and a modulating device, connected in parallel with the input device and connected to the antenna, for varying the impedance of the receiving element in accordance with the generated identification information, for modulating the second separation electric power of the interrogation signal in accordance with the identification information to generate the reply signal, and for feeding the reply signal to the antenna.

14 Claims, 10 Drawing Sheets

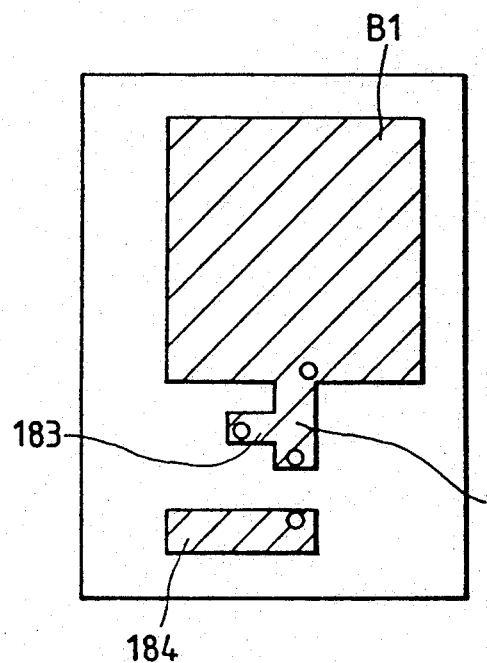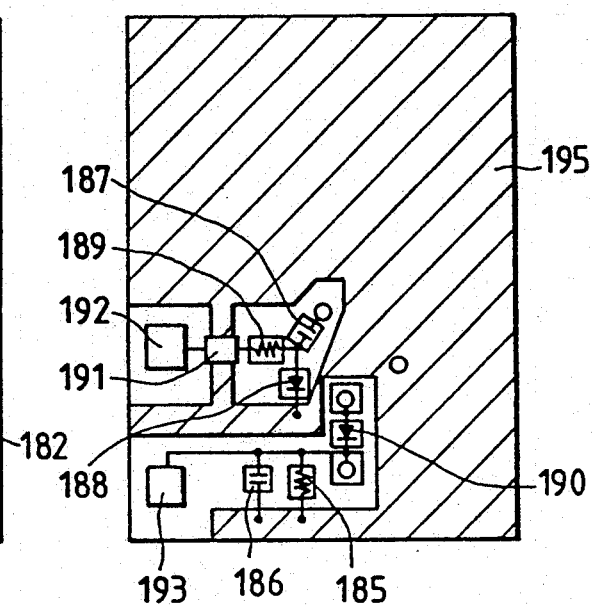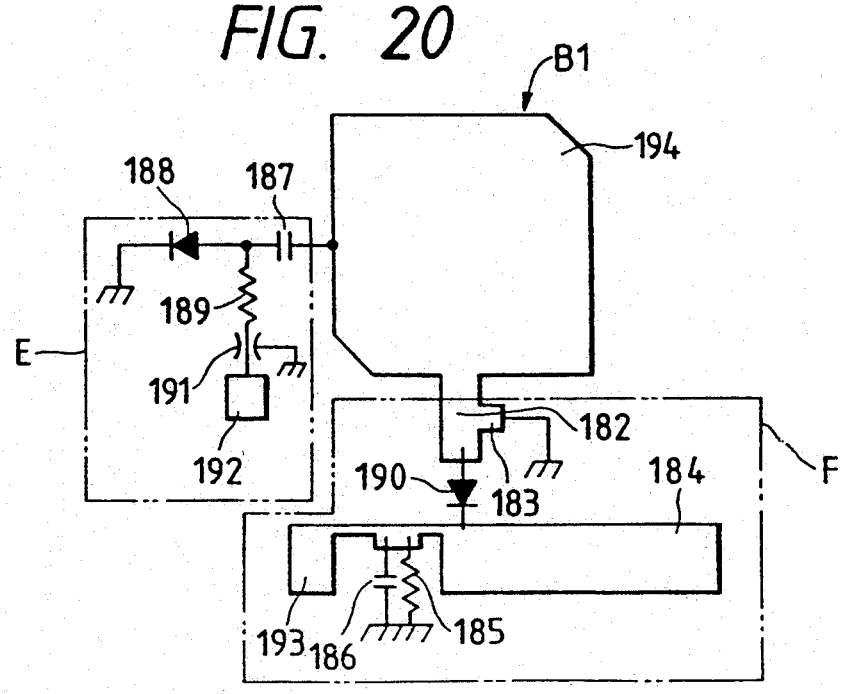

RESPONDER IN MOVABLE-OBJECT IDENTIFICATION SYSTEM

This is a continuation of application Ser. No. 07/774,255, filed on Oct. 10, 1991, which was abandoned upon the filing hereof.

BACKGROUND OF THE INVENTION

1. Field of the Invention

This invention relates to a responder or a transponder in a movable-object identification system.

2. Description of the Prior Art

There are known movable-object identification systems in which a responder (a transponder) mounted on a movable object can communicate with a fixed interrogator by radio. When the responder receives an interrogation signal (a challenge signal) from the interrogator, the responder automatically transmits a reply signal including identification information related to the movable object.

In some cases, an identification-code generator of a responder includes a memory storing various pieces of identification information, and the identification-code generator consumes an appreciable rate of dc power.

Some responders derive dc power from radio wave energy induced in an antenna. Specifically, such a responder has two antennas. One of the antennas is used for deriving dc power. A received signal induced in the other antenna is used as a carrier for a transmission signal. The two-antenna design is disadvantageous in compactness.

Japanese published unexamined patent application 1-218965 discloses a responder having a single antenna. In the responder of Japanese application 1-218965, a received interrogation signal induced in the antenna is divided by a distribution device into two, one being used for starting a CPU while the other being used as a carrier for a transmission signal. Specifically, the responder of Japanese application 1-218965 includes a diode for subjecting the part of the interrogation signal to a detection process, and a comparator for converting the level of the output detection signal from the diode into a binary CPU start control signal. The distribution device generally occupies a considerable space, so that the transponder of Japanese application 1-218965 tends to be large.

SUMMARY OF THE INVENTION

It is an object of this invention to provide an improved responder in a movable-object identification system.

According to a general aspect of this invention, a movable-object identification system includes an interrogator for transmitting an interrogation signal, and a responder mounted on a movable object for transmitting a reply signal in response to the interrogation signal, the reply signal containing identification information, the responder comprising:

an antenna for receiving the interrogation signal from the interrogator, and for radiating the reply signal;

input means connected to the antenna for receiving an electric power of the interrogation signal received by the antenna, the input means including a receiving element for dividing the received electric power into a first separation electric power and a second separation electric power corresponding to a traveling wave and reflected wave respectively, the receiving element having an impedance;

generating means for generating predetermined identification information by using the first separation electric power; and modulating means, connected in parallel with the input means and connected to the antenna, for varying the impedance of the receiving element in accordance with the generated identification information, for modulating the second separation electric power of the interrogation signal in accordance with the identification information to generate the reply signal, and for feeding the reply signal to the antenna.

BRIEF DESCRIPTION OF THE DRAWINGS

FIGS. 18 and 19 are diagrams showing opposite sides of a printed circuit board in an eleventh embodiment of this invention.

FIG. 20 is a diagram of an antenna, a modulator, and a detector in a twelfth embodiment of this invention.

DESCRIPTION OF THE FIRST PREFERRED EMBODIMENT

Figure 1:
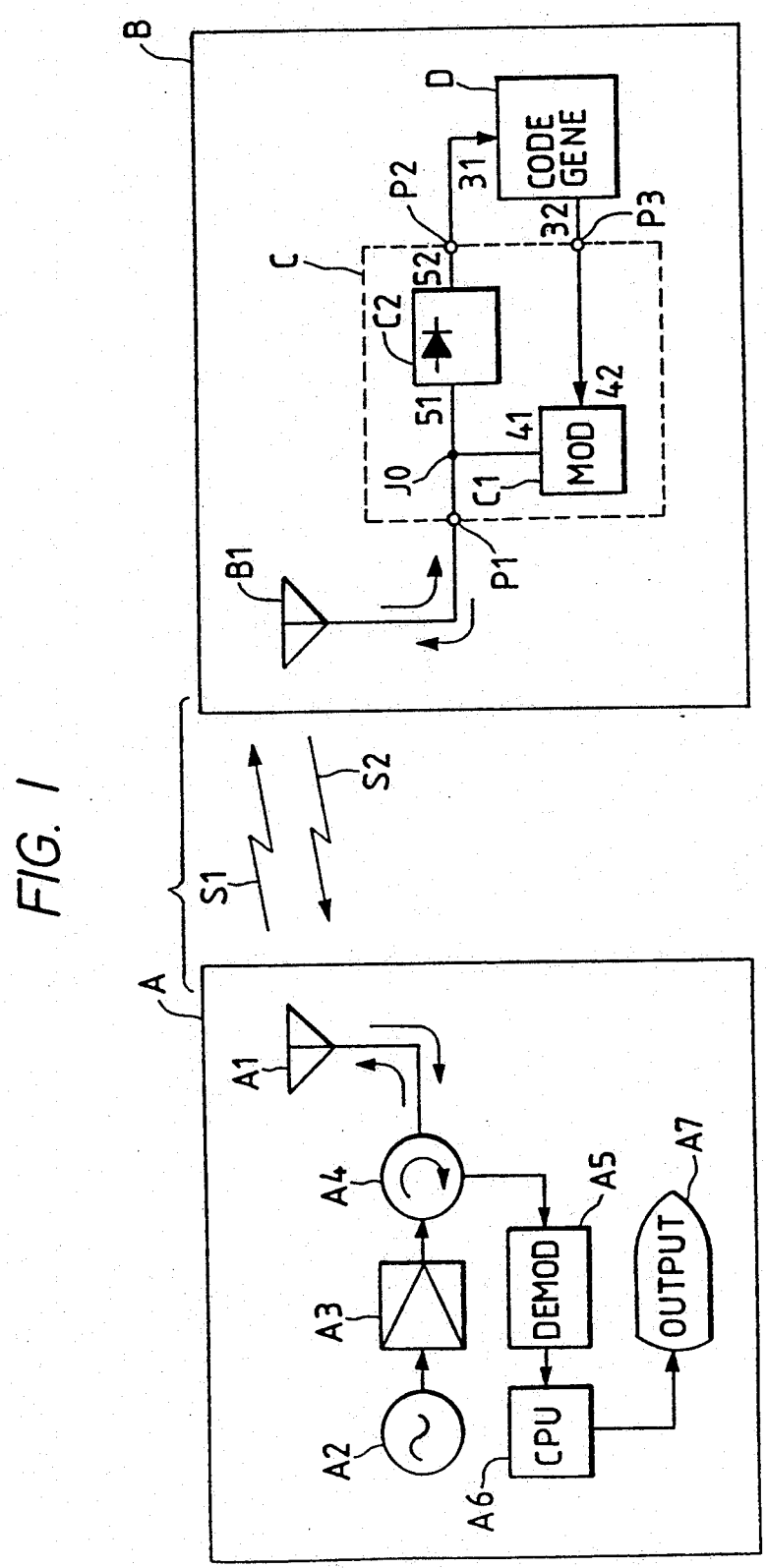
FIG. 1 is a diagram of a movable-object identification system including a responder according to a first embodiment of this invention.

With reference to FIG. 1, a movable-object identification system includes a fixed station A and a mobile station B which can communicate with each other by radio. The fixed station A includes an interrogator. The mobile station B is mounted on a movable object such as a vehicle or a movable article. The mobile station B includes a responder (a transponder).

The responder B receives an RF interrogation signal (a challenge signal) S1 from the interrogator A, and modulates the received interrogation signal S1 with identification information assigned to the related movable body and converts the received interrogation signal S1 into an RF modulation signal S2 including the identification information. The identification information includes, for example, an identification (ID) code or codes. Then, the responder B transmits the modulation signal S2 toward the interrogator A as a reply signal.

The interrogator A transmits the interrogation signal S1 into a predetermined area. The responder B on the movable object within the predetermined area receives the interrogation signal S1 and transmits the reply signal S2. The interrogator A receives the reply signal S2 and demodulates the identification information from the received reply signal S2. The interrogator A identifies the movable object by referring to the demodulated identification information.

As shown in FIG. 1, the interrogator A includes an oscillator A2 for outputting an interrogation signal S1 which is fed to an antenna A1 via an amplifier A3 and a circulator A4. The interrogation signal S1 is radiated from the antenna A1. A reply signal S2 induced in the antenna 1 is fed to a demodulator A5 via the circulator A4. The circulator A4 serves to separate a transmission signal and a reception signal, and the antenna A1 is used in common for both transmission and reception. The demodulator A5 recovers identification information from the received reply signal S2. A CPU A6 within the interrogator A analyzes the demodulated identification information. The result of the analyzation can be transmitted from the CPU A6 to an external device (not shown) via an output device A7.

As shown in FIG. 1, the responder B includes an antenna B1. An interrogation signal S1 induced in the antenna B1 is fed via a terminal P1 to a modulator C1 and a rectifier C2 within a modulation/rectification complex circuit C. The terminal P1 leads to the modulator C1 and the rectifier C2 via a junction or a branch point J0. A part of the interrogation signal S1 is accepted by the rectifier C2, and is rectified by the rectifier C2 into dc power. The output dc power from the rectifier C2 is fed via a terminal P2 to an identification code generator D to activate the latter. The identification code generator D includes a memory for storing identification information. The identification code generator D generates an identification code signal on the basis of the identification information read out from the memory. The identification code signal is fed from the identification code generator D to the modulator C1 via a terminal P3 as a modulating signal. Another part of the interrogation signal S1 is accepted by the modulator C1, and is modulated with the identification code signal by the modulator C1 so that the part of the interrogation signal S1 is converted into a reply signal S2 including the identification information. The modulator C1 reflects and returns the reply signal S2, and the reply signal S2 is fed back to the antenna B1 via the terminal P1. The reply signal S2 is radiated from the antenna B1.

Figure 2:
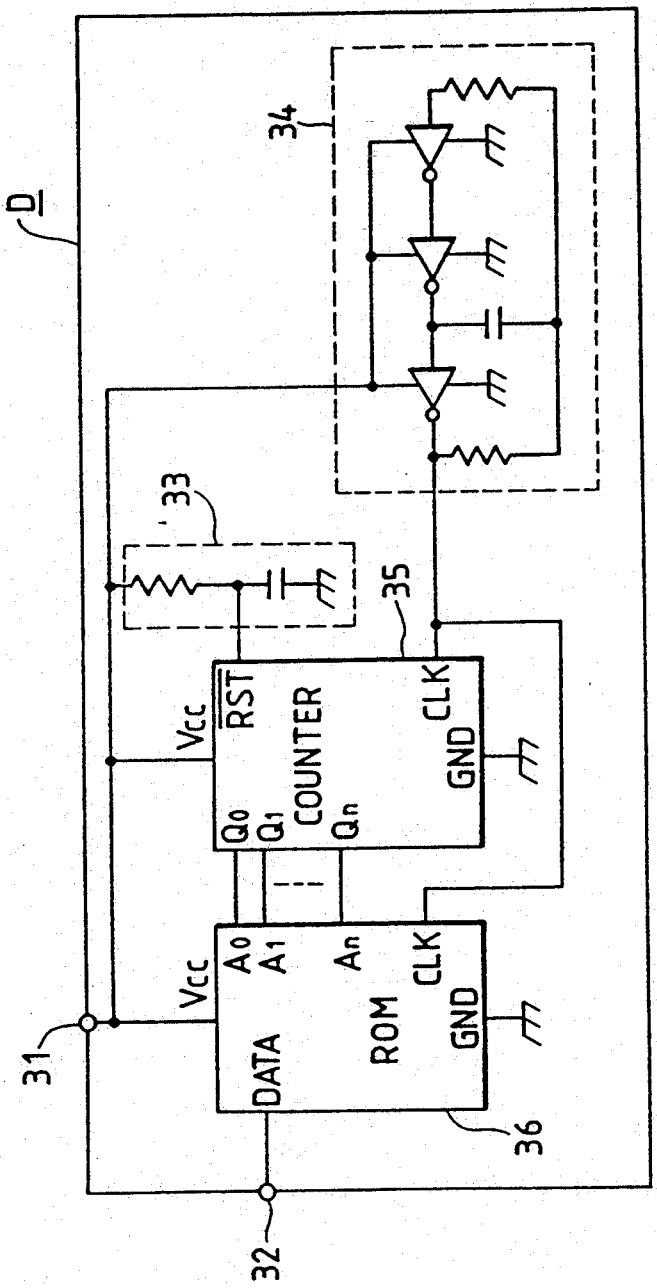
FIG. 2 is a diagram of the identification code generator of FIG. 1.

As shown in FIG. 2, the identification code generator D includes a read-only memory (a ROM) 36, an address counter 35, a clock signal generator 34, and a reset circuit 33. The ROM 36 stores different identification information data which are designated by different addresses respectively. When a dc power is fed to the devices 33-36 within the identification code generator D from the rectifier C2 (see FIG. 1) via a power supply input terminal 31, the devices 33-36 are activated by the dc power and they start to operate. Firstly, the reset circuit 33 clears the contents of the address counter 35, and resets the output address signal from the address counter 35 to an initial state. Then, the output address signal from the address counter 35 is updated each time the address counter 35 receives a clock pulse from the clock signal generator 34. The address signal is outputted from output terminals $Q_0$-$Q_n$ of the address counter 35 to input terminals $A_0$-$A_n$ of the ROM 36. The ROM 36 outputs identification information data which is designated by the input address signal. Since the address signal is periodically updated in response to the clock pulses, a sequence of identification information data is outputted from the ROM 36. The identification information data (the identification information signal) is outputted from a data terminal of the ROM 36, and is then transmitted to the modulator C1 (see FIG. 1) via a terminal 32.

Figure 3:
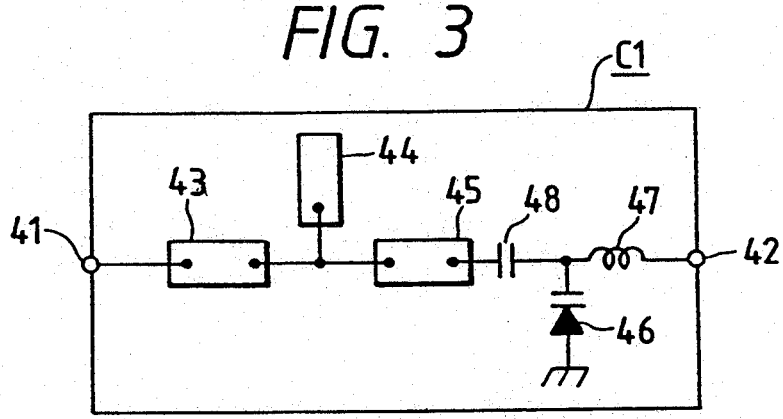
FIG. 3 is a schematic diagram of the modulator of FIG. 1.

As shown in FIG. 3, the modulator C1 includes terminals 41 and 42 which are connected to the antenna B1 and the identification code generator D (see FIG. 1) respectively. The modulator C1 also includes a phase-conversion transmission line 43, a load-conversion stub 44, a load-conversion transmission line 45, a variable capacitance diode 46, an inductor 47, and a dc-cut capacitor 48. The phase-conversion transmission line 43, the load-conversion stub 44, and the load conversion transmission line 45 are combined into a T-network. The terminal 41 is connected to one end of the dc-cut capacitor 48 via the phase-conversion transmission line 43 and the load-conversion transmission line 45. An end of the load-conversion stub 44 is connected to a junction between the phase-conversion transmission line 43 and the load-conversion transmission line 45. The other end of the dc-cut capacitor 48 is connected to the cathode of the variable capacitance diode 46 and one end of the inductor 47. The anode of the variable capacitance diode 46 is grounded. The other end of the inductor 47 is connected to the terminal 42. The inductor 47 forms a low pass filter.

The identification information signal outputted from the identification code generator D (see FIG. 1) is transmitted to the variable capacitance diode 46 via the terminal 42 and the inductor 47. The impedance of the variable capacitance diode 46 varies in accordance with the identification information signal. The T-network of the phase-conversion transmission line 43, the load-conversion stub 44, and the load conversion transmission line 45 is coupled to the variable capacitance diode 46 via the dc-cut capacitor 48. A part of the received interrogation signal S1 advances into the T-network via the terminal 41. The previously-mentioned variation in the impedance of the variable capacitance diode 46 causes a variation in an impedance at the terminal 41, so that the part of the received interrogation signal S1 is modulated in accordance with the identification information signal.

Circuit constants of the modulator C1 are chosen so that the minimum value of the impedance at the terminal 41 will be sufficiently or appreciably remote from zero. By the modulation, the part of the interrogation signal S1 is converted into a reply signal S2 containing the identification information. The reply signal S2 is reflected at the T-network, and is returned toward the antenna B1 (see FIG. 1) via the terminal 41.

Figure 4:
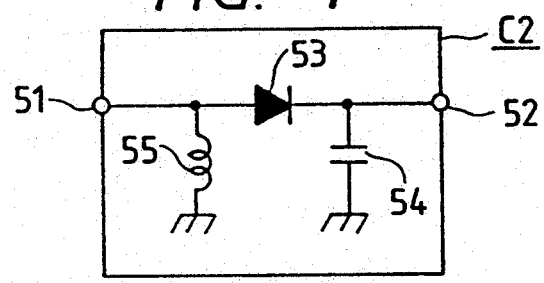
FIG. 4 is a schematic diagram of the rectifier of FIG. 1.

As shown in FIG. 4, the rectifier C2 includes terminals 51 and 52 connected to the antenna B1 and the identification code generator D (see FIG. 1) respectively. The rectifier C2 also includes a diode 53, a smoothing capacitor 54, and an inductor 55. The anode of the diode 53 is connected to the terminal 51, and the cathode of the diode 53 is connected to the terminal 52. One end of the inductor 55 is connected to the terminal 51, and the other end of the inductor 55 is grounded. The inductor 55 forms a dc return low pass filter. One end of the smoothing capacitor 54 is connected to the cathode of the diode 53, and the other end of the smoothing capacitor 54 is grounded. A large part of the received interrogation signal S1 advances into the rectifier C2 via the terminal 51, being rectified by the diode 53 and being smoothed by the smoothing capacitor 54 into a dc power. The output dc power from the rectifier C2 is transmitted via the terminal 52 to the identification code generator D (see FIG. 1).

It should be noted that the diode 53 in the rectifier C2 may be replaced by a combination of diodes which serves as a full-wave rectifier.

This embodiment of this invention has the following advantages. As understood from the previous description, a part of electric energy of the interrogation signal is converted by the rectifier C2 into a dc power which is used as a power supply for the responder B. Thus, it is unnecessary to provide an additional power supply such as a battery or a cell in the responder B. In addition, only a single antenna suffices in the responder B. Specifically, the antenna B1 of the responder B is used in three ways, that is, signal reception, signal transmission, and power capture.

A further description will be given of the modulation/rectification complex circuit C which forms a load for the antenna B1. It is now assumed that the rectifier C2 has good input matching conditions and the normalized admittance Yd of the rectifier C2 equals 1. Furthermore, it is assumed that the modulator C1 is designed as a phase modulator for changing a signal phase between 90° and −90°. In this case, the normalized admittance Ym of the phase modulator is expressed as "Ym=±j".

Since the modulation/rectification complex circuit C forms a load for the antenna B1, the resultant admittance Y and the reflection coefficient Γ of the complex circuit C are expressed in the following equations.

$$Y = Yd + Ym = 1 \pm j$$

$$\Gamma = 0.45 \angle \pm 117°$$

where the reflection coefficient Γ is a vector having a magnitude of 0.45 and directions of ∠±117°. It should be noted that the character "∠" denotes that the following values are angles. Under these conditions, the modulation characteristics of the responder B which are observed from the interrogator A correspond to phase modulation having an absolute reflection coefficient of 0.45 and a phase difference (deviation) of 126°.

Regardless of the conditions of the modulation, 20% of electric power received by the antenna B1 is used for a reply signal S2, and the remaining 80% is used for a dc power. Only 20% of the electric power suffices for the reply signal S2 since even a small power of the reply signal S2 enables the transmission of the identification information from the responder B to the interrogator A.

In general, the loss in the modulator C1 increases as the conductance of the modulator C1 increases. In addition, the ratio of an electric power radiated from the antenna B1 to an electric power received by the antenna B1 increases as the susceptance of the modulator C1 increases. Thus, the modulator C1 is preferably designed as a phase modulator having a very small conductance and a moderate susceptance (a susceptance not excessively large).

In the case where the impedance of the modulator C1 is equal or very close to 0, the conductance or the susceptance of the modulator C1 is extremely large. Thus, the impedance of the modulator C1 is preferably set to a value appreciably separate from 0.

The modulator C1 may be designed as a phase modulator for changing a signal phase between 45° and −45° or a phase modulator for changing a signal phase between 120° and 0°.

The modulator C1 may also be designed as an amplitude modulator having an impedance changeable between a matching load impedance and an infinite impedance. The amplitude modulator C1 will be further described hereinafter. The normalized admittance Ym of the amplitude modulator C1 is changed between 1 and 0. The resultant admittance Y of the complex circuit C is changed between 2 and 1. Under these conditions, the modulation characteristics of the responder B which are observed from the interrogator A correspond to amplitude modulation having a reflection coefficient Γ changed between 0.33 and 0. From the averaging standpoint, about 6% of electric power received by the antenna B1 is used for a reply signal S2, and about 72% is used for a dc power and the remaining 22% is lost in the amplitude modulator C1.

DESCRIPTION OF THE SECOND PREFERRED EMBODIMENT

A second embodiment of this invention is similar to the embodiment of FIGS. 1-4 except for the design of a modulation/rectification complex circuit C.

Figure 5:
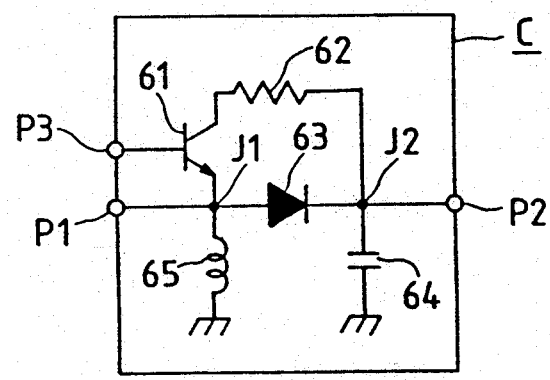
FIG. 5 is a schematic diagram of a modulation/rectification complex circuit in a second embodiment of this invention.

As shown in FIG. 5, the modulation/rectification complex circuit C in the second embodiment includes terminals P1, P2, and P3. The terminal P1 leads from an antenna B1 (see FIG. 1). The terminal P2 leads to a power supply terminal of an identification code generator D (see FIG. 1). The terminal P3 leads from an output terminal of the identification code generator D. The modulation/rectification complex circuit C includes a diode 63 connected between the terminals P1 and P2. An inductor 65 forms a dc return low pass filter. One end of the inductor 65 is connected to the terminal P1, and the other end of the inductor 65 is grounded. One end of a smoothing capacitor 64 is connected to the terminal P2, and the other end of the smoothing capacitor 64 is grounded. A transistor 61 forms a switching element. The base of the transistor 61 is connected to the terminal P3. The emitter of the transistor 61 is connected to a junction J1 between the terminal P1 and the diode 63. The collector of the transistor 61 is connected via a resistor 62 to a junction J2 between the diode 63 and the terminal P2. The emitter-collector path of the transistor 61 and the resistor 62 compose a bypass circuit for the diode 63.

A large part of a received interrogation signal S1 advances from the antenna B1 (see FIG. 1) into the diode 63 via the terminal P1, being rectified by the diode 63 and being smoothed by the smoothing capacitor 64 into a dc power. The dc power is fed via the terminal P2 to the identification code generator D (see FIG. 1) to activate the latter. When activated, the identification code generator D outputs an identification information signal which is applied to the base of the transistor 61 via the terminal P3. The transistor 61 changes between an on state and an off state in response to the identification information signal so that the bypass circuit for the diode 63 is closed and opened in response to the identification information signal. Thus, operating conditions of the diode 63 are changed in response to the identification information signal. Therefore, the characteristics of the reflection of the interrogation signal S1 at the modulation/rectification complex circuit C vary in response to the identification information signal. As a result, a part of the interrogation signal S1 is modulated with the identification information signal and is thus converted into a reply signal S2 containing the identification information, and the reply signal S2 is reflected and returned toward the antenna B1 (see FIG. 1) via the terminal P1.

The ratio between a rectified electric power and a reflected electric power is determined by the resistance of the bypass resistor 62 and the internal resistance of the diode 63. Specifically, as the resistance of the bypass resistor 62 decreases, the circuit impedance variation responsive to the state change of the transistor 61 increases and thus the modulated electric power (the reflected electric power) increases while the rectified electric power decreases.

It should be noted that the modulation may be executed by varying other parameters such as the bias voltage of the diode 63, the input signal power, or the load resistance.

DESCRIPTION OF THE THIRD PREFERRED EMBODIMENT

A third embodiment of this invention is similar to the embodiment of FIGS. 1-4 except for the design of a modulation/rectification complex circuit C.

Figure 6:
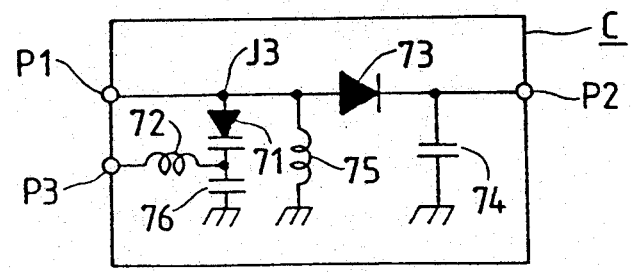
FIG. 6 is a schematic diagram of a modulation/rectification complex circuit in a third embodiment of this invention.

As shown in FIG. 6, the modulation/rectification complex circuit C in the third embodiment includes terminals P1, P2, and P3. The terminal P1 leads from an antenna B1 (see FIG. 1). The terminal P2 leads to a power supply terminal of an identification code generator D (see FIG. 1). The terminal P3 leads from an output terminal of the identification code generator D. The modulation/rectification complex circuit C includes a diode 73 connected between the terminals P1 and P2. An inductor 75 forms a dc return low pass filter. One end of the inductor 75 is connected to the terminal P1, and the other end of the inductor 75 is grounded. One end of a smoothing capacitor 74 is connected to the terminal P2, and the other end of the smoothing capacitor 74 is grounded. The anode of a variable capacitance diode 71 is connected to a junction J3 between the terminal P1 and the diode 73. The cathode of the variable capacitance diode 71 is grounded via a bypass capacitor 76. An inductor 72 forms a low pass filter. One end of the inductor 72 is connected to the terminal P3, and the other end of the inductor 72 is connected to the junction between the variable capacitance diode 71 and the bypass capacitor 76.

A large part of a received interrogation signal S1 advances from the antenna B1 (see FIG. 1) into the diode 73 via the terminal P1, being rectified by the diode 73 and being smoothed by the smoothing capacitor 74 into a dc power. The dc power is fed via the terminal P2 to the identification code generator D (see FIG. 1) to activate the latter. When activated, the identification code generator D outputs an identification information signal which is applied to the variable capacitance diode 71 via the terminal P3 and the inductor 72. As a result, the reverse bias of the variable capacitance diode 71 varies in response to the identification information signal. Thus, operating conditions of the diode 73 are changed in response to the identification information signal. Therefore, the characteristics of the reflection of the interrogation signal S1 at the modulation/rectification complex circuit C vary in response to the identification information signal. As a result, a part of the interrogation signal S1 is modulated with the identification information signal and is thus converted into a reply signal S2 containing the identification information, and the reply signal S2 is reflected and returned toward the antenna B1 (see FIG. 1) via the terminal P1.

DESCRIPTION OF THE FOURTH PREFERRED EMBODIMENT

A fourth embodiment of this invention is similar to the embodiment of FIGS. 1-4 except that a power distribution device C3 is added to a modulation/rectification complex circuit C.

Figure 7:
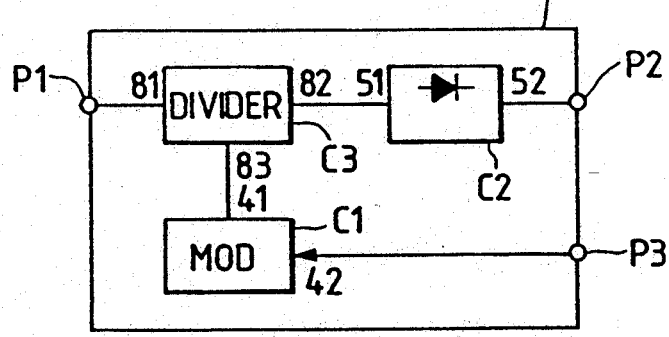
FIG. 7 is a block diagram of a modulation/rectification complex circuit in a fourth embodiment of this invention.

As shown in FIG. 7, the modulation/rectification complex circuit C in the fourth embodiment includes a power distribution device C3 having terminals 81, 82, and 83 which are connected to a terminal P1, a rectifier C2, and a modulator C1 respectively. The terminal P1 leads from an antenna B1 (see FIG. 1).

A received interrogation signal S1 advances from the antenna B1 to the power distribution device C3 via the terminal P1. The power distribution device C3 divides the electric power of the interrogation signal S1 into two signals which are fed to the modulator C1 and the rectifier C2 respectively. The power distribution device C3 transmits at least part of a reply signal S2 from the modulator C1 toward the antenna B1 via the terminal P1.

Figure 8A:
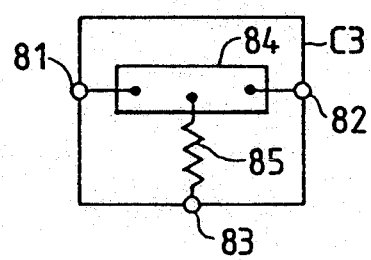
FIG. 8A is a schematic diagram of the power distribution device of FIG. 7.

As shown in FIG. 8A, the power distribution device C3 includes a transmission line 84 having first and second ends which are connected to the terminals 81 and 82 respectively. The power distribution device C3 also includes a resistor 85. One end of the resistor 85 is connected to an intermediate point of the transmission line 84, and the other end of the resistor 85 is connected to the terminal 83. An electric power inputted via the terminal 81 advances along the transmission line 84 and is divided in the transmission line 84 into two, one being outputted via terminal 82 while the other passing through the resistor 85 and being outputted via the terminal 83. An electric power inputted via the terminal 83 passes through the resistor 85 and advances into the transmission line 84, being divided into two which are outputted via the terminals 81 and 82 respectively.

DESCRIPTION OF THE FIFTH PREFERRED EMBODIMENT

A fifth embodiment of this invention is similar to the embodiment of FIGS. 7 and 8A except for the design of a power distribution device C3.

Figure 8B:
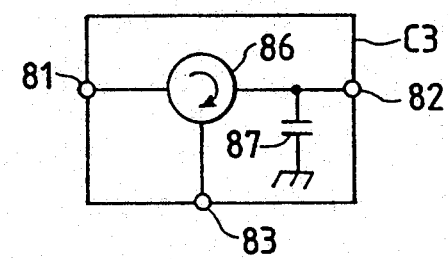
FIG. 8B is a schematic diagram of a power distribution device in a fifth embodiment of this invention.

As shown in FIG. 8B, the power distribution device C3 in the fifth embodiment includes a circulator 86 connected among terminals 81, 82, and 83. The power distribution device C3 also includes a capacitor 87. One end of the capacitor 87 is connected to a junction between the circulator 86 and the terminal 82, and the other end of the capacitor 87 is grounded.

An electric power inputted via the terminal 81 advances into the circulator 86 and passes through the circulator 86, being transmitted toward the terminal 82. The capacitor 87 causes mismatching between the circulator 86 and a rectifier C2 (see FIG. 7), so that a part of the electric power is reflected at the capacitor 87 and is returned to the circulator 86 while the remaining part of the electric power is fed to the rectifier C2. The reflected electric power is directed by the circulator 86 toward the terminal 83, being outputted via the terminal 83. An electric power inputted via the terminal 83 advances into the circulator 86, being directed by the circulator 86 toward the terminal 81 and being outputted via the terminal 81.

It should be noted that the power distribution device C3 may be composed of a T-type distribution device using a micro-strip-line, or a coupler.

DESCRIPTION OF THE SIXTH PREFERRED EMBODIMENT

A sixth embodiment of this invention is similar to the embodiment of FIGS. 1-4 except for the design of a modulator C1.

Figure 9:
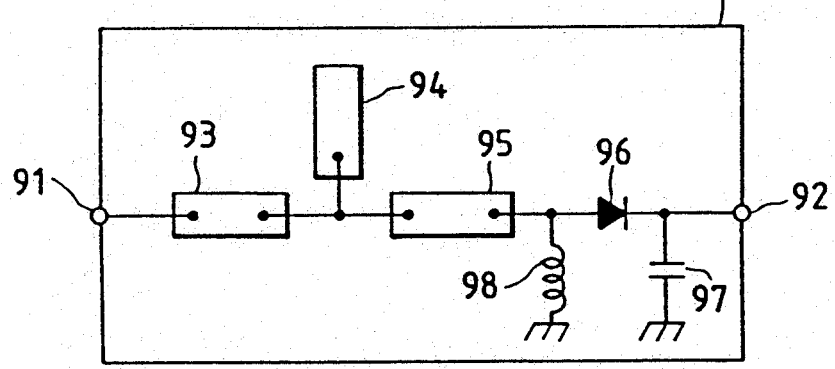
FIG. 9 is a schematic diagram of a modulator in a sixth embodiment of this invention.

As shown in FIG. 9, the modulator C1 in the sixth embodiment includes terminals 91 and 92 connected to an antenna B1 and an information code generator D (see FIG. 1) respectively. The modulator C1 also includes a phase-conversion transmission line 93, a load-conversion stub 94, a load-conversion transmission line 95, a diode 96, a bypass capacitor 97, and an inductor 98. The phase-conversion transmission line 93, the load-conversion stub 94, and the load-conversion transmission line 95 are combined into a T-network. The terminal 91 leads to the anode of the diode 96 via the phase-conversion transmission line 93 and the load-conversion transmission line 95. The inductor 98 forms a low pass filter. One end of the inductor 98 is connected to a junction between the load-conversion transmission line 95 and the diode 96, and the other end of the inductor 98 is grounded. The cathode of the diode 96 is connected to the terminal 92. One end of the bypass capacitor 97 is connected to a junction between the diode 96 and the terminal 92, and the other end of the bypass capacitor 97 is grounded.

An identification information signal outputted from the identification code generator D (see FIG. 1) is transmitted to the diode 96 via the terminal 92, so that the reverse bias of the diode 96 varies in response to the identification information signal. On the other hand, a part of a received interrogation signal S1 advances from the antenna B1 (see FIG. 1) into the T-network via the terminal 91. Since the T-network is coupled to the diode 96, the previously-mentioned variation in the bias voltage of the diode 96 causes a variation in an impedance at the terminal 91. As a result, the part of the received interrogation signal S1 is modulated in accordance with the identification information signal. By the modulation, the part of the interrogation signal S1 is converted into a reply signal S2 containing the identification information. The reply signal S2 is reflected at the T-network, and is returned toward the antenna B1 (see FIG. 1) via the terminal 91.

The modulator C1 can also operate as a demodulator. Specifically, during a demodulation process, a received interrogation signal S1 is fed via the T-network to a demodulator composed of the diode 96, the inductor 98, and the capacitor 97. In the case where the interrogation signal S1 contains information, the demodulator recovers the information from the interrogation signal S1 and outputs a related information signal which is transmitted via the terminal 92. It should be noted that the modulation process is suspended during the demodulation process.

For example, the demodulated information is used for updating identification information stored in the information code generator D (see FIG. 1). In this case, a ROM storing the identification information is preferably of the electrically erasable and programmable type. The demodulated information may also be used for starting the information code generator D.

DESCRIPTION OF THE SEVENTH PREFERRED EMBODIMENT

A seventh embodiment of this invention is similar to the embodiment of FIGS. 1-4 except for the design of a rectifier C2.

Figure 10:
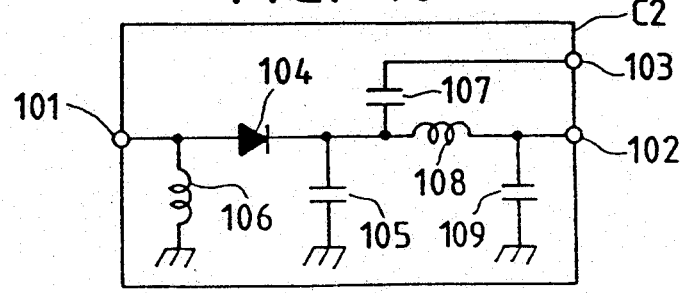
FIG. 10 is a schematic diagram of a rectifier in a seventh embodiment of this invention.

As shown in FIG. 10, the rectifier C2 in the seventh embodiment includes terminals 101, 102, and 103. The terminals 101 and 102 are connected to an antenna B1 and an information code generator D (see FIG. 1) respectively. The rectifier C2 also includes a diode 104, capacitors 105, 107, and 109, and inductors 106 and 108. The anode of the diode 104 is connected to the terminal 101, and the cathode of the diode 104 is connected to the terminal 102 via the inductor 108. The inductor 108 forms a low pass filter. One end of the inductor 106 is connected to the terminal 101, and the other end of the inductor 106 is grounded. The inductor 106 forms a dc return low pass filter. One end of the capacitor 105 is connected to a junction between the diode 104 and the inductor 108, and the other end of the capacitor 105 is grounded. The capacitor 105 serves as a smoothing capacitor. One end of the capacitor 107 is connected to the junction between the diode 104 and the inductor 108, and the other end of the capacitor 107 is connected to the terminal 103. The capacitor 107 forms a high pass filter. One end of the capacitor 109 is connected to the terminal 102, and the other end of the capacitor 109 is grounded. The capacitor 109 serves as a voltage stabilizing capacitor.

When an electric power containing an amplitude-modulated carrier and modulating information is fed to the terminal 101, the electric power advances into the diode 104. The electric power is converted by the diode 104 into dc components and ac components corresponding to a dc power and the demodulated information respectively. The dc components are smoothed by the LC network of the capacitors 105 and 109 and the inductor 108, being transmitted via the terminal 102 to the information code generator D (see FIG. 1) to activate the latter. The demodulated information passes through the capacitor 107, being transmitted via the terminal 103.

DESCRIPTION OF THE EIGHTH PREFERRED EMBODIMENT

An eighth embodiment of this invention is similar to the embodiment of FIGS. 1-4 except for the design of a modulation/rectification complex circuit C.

Figure 11:
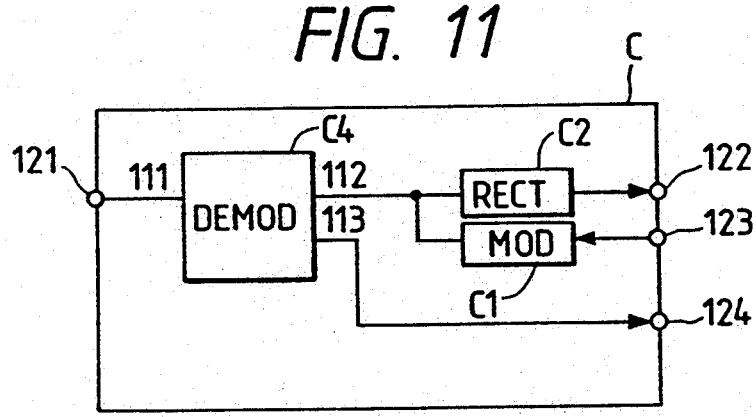
FIG. 11 is a block diagram of a modulation/rectification complex circuit in an eighth embodiment of this invention.

As shown in FIG. 11, the modulation/rectification complex circuit C in the eighth embodiment includes terminals 121, 122, 123, and 124. The terminal 121 leads from an antenna B1 (see FIG. 1). The terminal 122 leads to a power supply terminal of an identification code generator D (see FIG. 1). The terminal 123 leads from an output terminal of the identification code generator D. The modulation/rectification complex circuit C also includes a modulator C1, a rectifier C2, and a demodulator C4. The demodulator C4 is connected to the terminals 121 and 124, the modulator C1, and the rectifier C2. An electric energy containing information and being inputted via the terminal 121 advances into the demodulator C4. The demodulator C4 captures a part of the electric energy, and demodulates the information therefrom. The demodulator C4 outputs the demodulated information to the terminal 124. The remaining part of the electric power passes through the demodulator C4, being fed to the modulator C1 and the rectifier C2. The rectifier C2 converts the input electric power into a dc power which is fed via the terminal 122 to the identification code generator D to activate the latter. The modulator C1 receives an identification information signal from the identification code generator D via the terminal 123, and modulates the input electric power with the identification information signal to generate a reply signal S2. The reply signal S2 moves back from the modulator C1 toward the antenna B1 via the demodulator C4.

Figure 12:
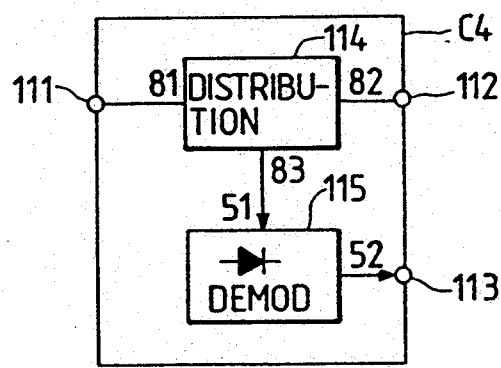
FIG. 12 is a block diagram of the demodulator of FIG. 11.

As shown in FIG. 12, the demodulator C4 includes terminals 111, 112, and 113. The terminal 111 is connected to the terminal 121 (see FIG. 11). The terminal 112 is connected to the modulator C1 and the rectifier C2 (see FIG. 11). The terminal 113 is connected to the terminal 124 (see FIG. 11). The demodulator C4 also includes a power distribution device 114 and a demodulating section 115. The power distribution device 114 is connected between the terminals 111 and 112. The demodulating section 115 is connected between the power distribution device 114 and the terminal 113. The power distribution device 114 captures a part of an electric power flowing between the terminals 111 and 114, and feeds the captured part of the electric power to the demodulating section 115. The demodulating section 115 demodulates information from the input electric power, and outputs the demodulated information to the terminal 113. The power distribution device 114 can be composed of the power distribution device C3 of FIG. 8A or FIG. 8B. The demodulating section 115 can be composed of a network including a diode, an inductor, and a capacitor which is similar to the internal design of the rectifier C2 of FIG. 4.

DESCRIPTION OF THE NINTH PREFERRED EMBODIMENT

A ninth embodiment of this invention is similar to the embodiment of FIGS. 11 and 12 except for a design change indicated hereinafter.

Figure 13:
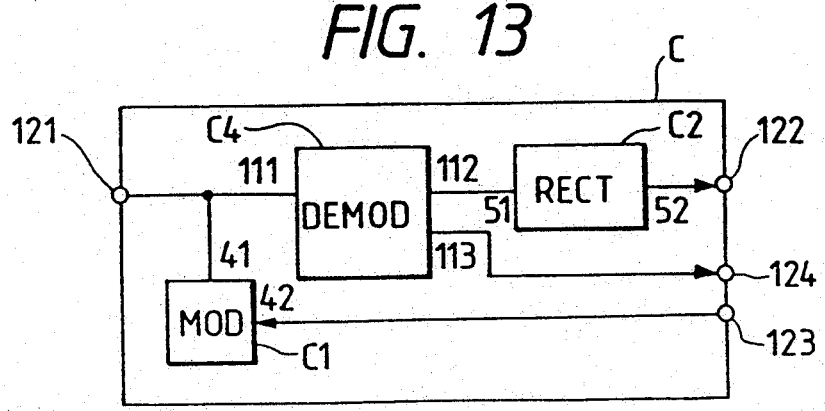
FIG. 13 is a block diagram of a modulation/rectification complex circuit in a ninth embodiment of this invention.

As shown in FIG. 13, a modulation/rectification complex circuit C in the ninth embodiment includes terminals 121, 122, 123, and 124. The terminal 121 leads from an antenna B1 (see FIG. 1). The terminal 122 leads to a power supply terminal of an identification code generator D (see FIG. 1). The terminal 123 leads from an output terminal of the identification code generator D. The modulation/rectification complex circuit C also includes a modulator C1, a rectifier C2, and a demodulator C4. The demodulator C4 is connected between the modulator C1 and the rectifier C2. Specifically, the demodulator C4 is connected to the terminals 121 and 124, the modulator C1, and the rectifier C2. The modulator C1 is connected to the terminals 121 and 123, and the demodulator C4. The rectifier C2 is connected between the demodulator C4 and the terminal 122.

An electric energy containing information and being inputted via the terminal 121 advances into the modulator C1 and the demodulator C4. The demodulator C4 captures a part of the incoming electric energy, and demodulates the information therefrom. The demodulator C4 outputs the demodulated information to the terminal 124. The remaining part of the incoming electric power passes through the demodulator C4, being fed to the rectifier C2. The rectifier C2 converts the input electric power into a dc power which is fed via the terminal 122 to the identification code generator D to activate the latter. The modulator C1 receives an identification information signal from the identification code generator D via the terminal 123, and modulates the incoming electric power with the identification information signal to generate a reply signal S2. The reply signal S2 moves back from the modulator C1 toward the antenna B1 via the terminal 121.

DESCRIPTION OF THE TENTH PREFERRED EMBODIMENT

Figure 14:
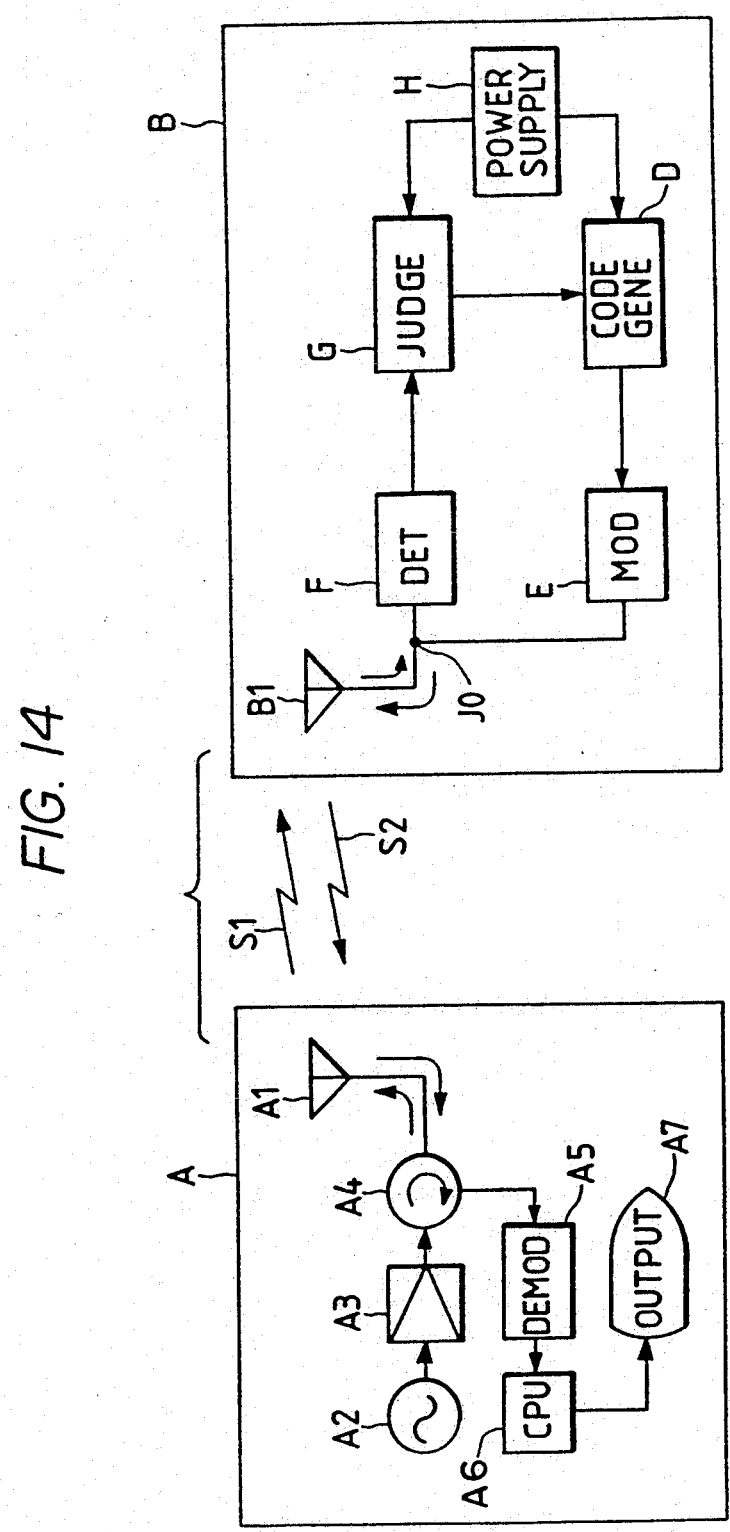
FIG. 14 is a diagram of a movable-object identification system including a responder according to a tenth embodiment of this invention.

With reference to FIG. 14, a movable-object identification system includes a fixed station A and a mobile station B which can communicate with each other by radio. The fixed station A includes an interrogator. The mobile station B is mounted on a movable object such as a vehicle or a movable article. The mobile station B includes a responder (a transponder).

The responder B receives an RF interrogation signal (a challenge signal) S1 from the interrogator A, and modulates the received interrogation signal S1 with identification information assigned to the related movable body and converts the received interrogation signal S1 into an RF modulation signal S2 including the identification information. The identification information includes, for example, an identification (ID) code. Then, the responder B transmits the modulation signal S2 toward the interrogator A as a reply signal.

The interrogator A transmits the interrogation signal S1 into a predetermined area. The responder B on the movable object within the predetermined area receives the interrogation signal S1 and transmits the reply signal S2. The interrogator A receives the reply signal S2 and demodulates the identification information from the received reply signal S2. The interrogator A identifies the movable object by referring to the demodulated identification information.

As shown in FIG. 14, the interrogator A includes an oscillator A2 for outputting an interrogation signal S1 which is fed to an antenna A1 via an amplifier A3 and a circulator A4. The interrogation signal S1 is radiated from the antenna A1. A reply signal S2 induced in the antenna A1 is fed to a demodulator A5 via the circulator A4. The circulator A4 serves to separate a transmission signal and a reception signal, and the antenna A1 is used in common for both transmission and reception.

The demodulator A5 recovers identification information from the received reply signal S2. A CPU A6 within the interrogator A analyzes the demodulated identification information. The result of the analyzation can be transmitted from the CPU A6 to an external device (not shown) via an output device A7.

As shown in FIG. 14, the responder B includes an antenna B1, a modulator E, a detector F, a judgment section G, a power supply H, and an identification code generator D. An interrogation signal S1 induced in the antenna B1 is fed via a junction or a branch point J0 to the modulator E and the detector F. A part of the interrogation signal S1 is accepted by the detector F, and is subjected by the detector F to a detection process. The detector F outputs the result of the detection to the judgment section G. The judgment section G and the identification code generator D are activated by an electric energy fed from the power supply H. The judgment section G executes a judgment process on the result of the detection, and generates a control signal in accordance with the result of the judgment. The judgment section G outputs the control signal to the identification code generator D. The identification code generator D includes a memory for storing identification information. The identification code generator D is triggered by the control signal from the judgment section G, generating an identification code signal on the basis of the identification information read out from the memory. The identification code signal is fed from the identification code generator D to the modulator E. Another part of the interrogation signal S1 is accepted by the modulator E, and is modulated with the identification code signal by the modulator E so that the part of the interrogation signal S1 is converted into a reply signal S2 including the identification information. The modulator E reflects and returns the reply signal S2, and the reply signal S2 is fed back to the antenna B1 via the junction J0. The reply signal S2 is radiated from the antenna B1. As understood from the previous description, the antenna B1 is used in common for both reception and transmission.

Figure 15:
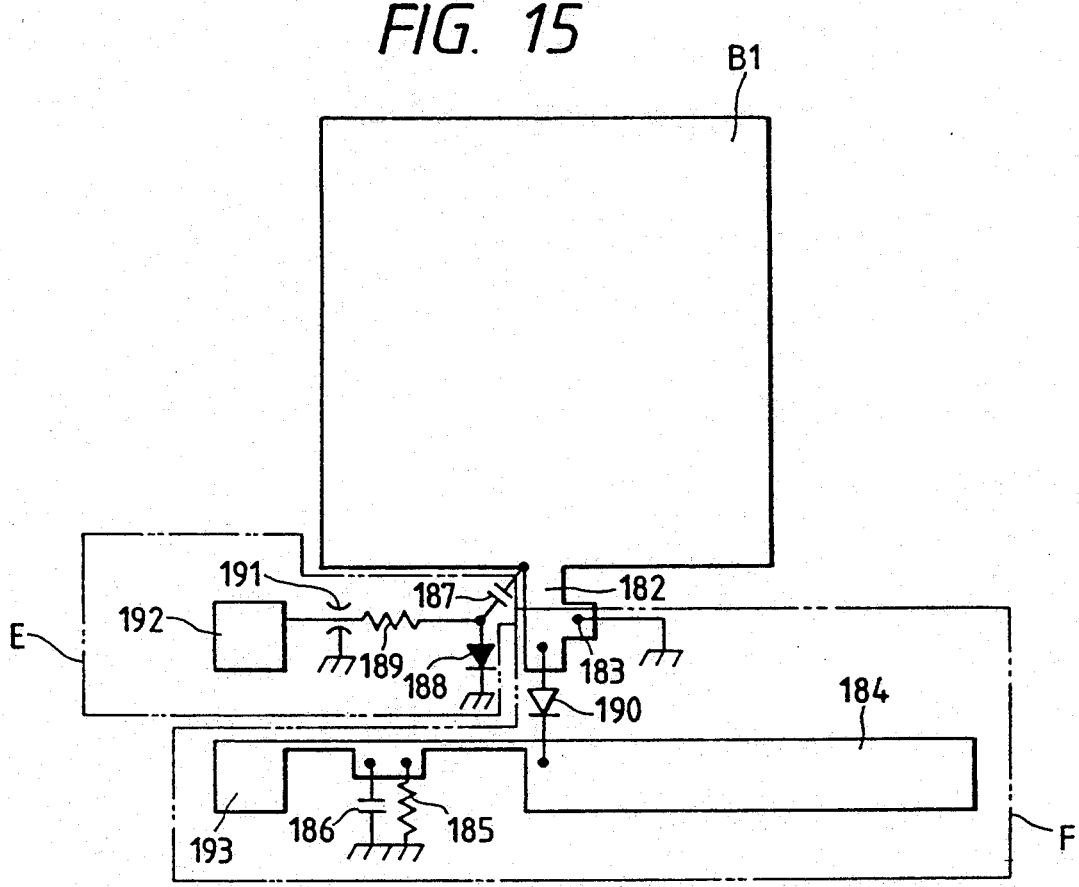
FIG. 15 is a schematic diagram of the modulator and the detector of FIG. 14.

As shown in FIG. 15, the antenna B1 within the responder B is of a micro-strip type, and an RF electric power induced in the antenna B1 is guided to a detection diode 190 via a micro-strip-line 182. An intermediate part of the micro-strip-line 182 is formed with a stub 183, the distal end of which is grounded.

The anode of the detection diode 190 is connected to the micro-strip-line 182, and the cathode of the detection diode 190 is connected to an intermediate point of another micro-strip-line 184. The length of the micro-strip-line 184 is chosen so as to correspond to a quarter of the wavelength of the handled RF electric power. One end of a resistor 185 is connected to the micro-strip-line 184, and the other end of the resistor 185 is grounded. One end of a capacitor 186 is connected to the micro-strip-line 184, and the other end of the capacitor 186 is grounded. An end of the micro-strip-line 184 is formed with a detection terminal 193 which leads to the identification code generator D (see FIG. 14). The devices 182, 183, 184, 185, 186, and 190 compose the detector F.

One end of a capacitor 187 is connected to a junction between the antenna B1 and the micro-strip-line 182. The other end of the capacitor 187 is connected to the anode of a diode 188 and one end of a resistor 189. The cathode of the diode 188 is grounded. The other end of the resistor 189 is connected to a modulation terminal 192 which leads to the identification code generator D (see FIG. 14). A feed-through capacitor 191 is provided on the connection between the resistor 189 and the modulation terminal 192. The body of the feed-through capacitor 191 is grounded. The devices 187, 188, 189, and 191 compose the modulator E.

Figure 16:
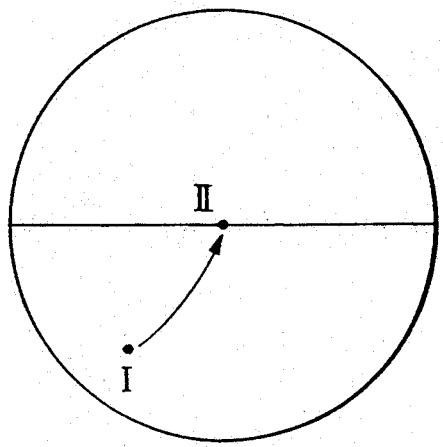
FIG. 16 is a Smith chart related to the voltage standing-wave ratio in the matching between the antenna and the next stage of FIG. 14.

In the case where the voltage at the modulation terminal 192 is equal to 0 V, that is, in the case where the level of the identification information signal outputted from the identification code generator D (see FIG. 14) is equal to 0 V corresponding to a logic state of "0", the resistance of the diode 188 is approximately equal to an infinite value so that the modulator E is substantially uncoupled from the antenna B1. In this case, the impedance of the combination of the modulator E and the detector F, which is observed from the antenna B1, agrees with an off-center point I in FIG. 16. The off-center point I in FIG. 16 corresponds to a voltage standing-wave ration (VSWR) of 5 to 6. As a result, 67%–72% of radio waves (an interrogation signal S1) received by the antenna B1 is reflected or re-radiated from the antenna B1, while the remaining 28%–33% of the received radio waves is guided to the detector F.

In the case where the voltage at the modulation terminal 192 is equal to a predetermined level different from 0 V, that is, in the case where the level of the identification information signal outputted from the identification code generator D (see FIG. 14) is equal to the predetermined non-zero level corresponding to a logic state of "1", the diode 188 is conductive so that a suitable load composed of the capacitor 187 and the diode 188 is coupled to the antenna B1. In this case, the impedance of the combination of the modulator E and the detector F, which is observed from the antenna B1, essentially agrees with a central point II in FIG. 16. The central point II in FIG. 16 corresponds to a voltage standing-wave ratio (VSWR) of 1. As a result, approximately all of radio waves (an interrogation signal S1) received by the antenna B1 is guided to the detector F and is subjected to a detection process by the detection diode 190. The result of the detection is transmitted to the detection terminal 193 via the micro-strip-line 184.

Figure 17:
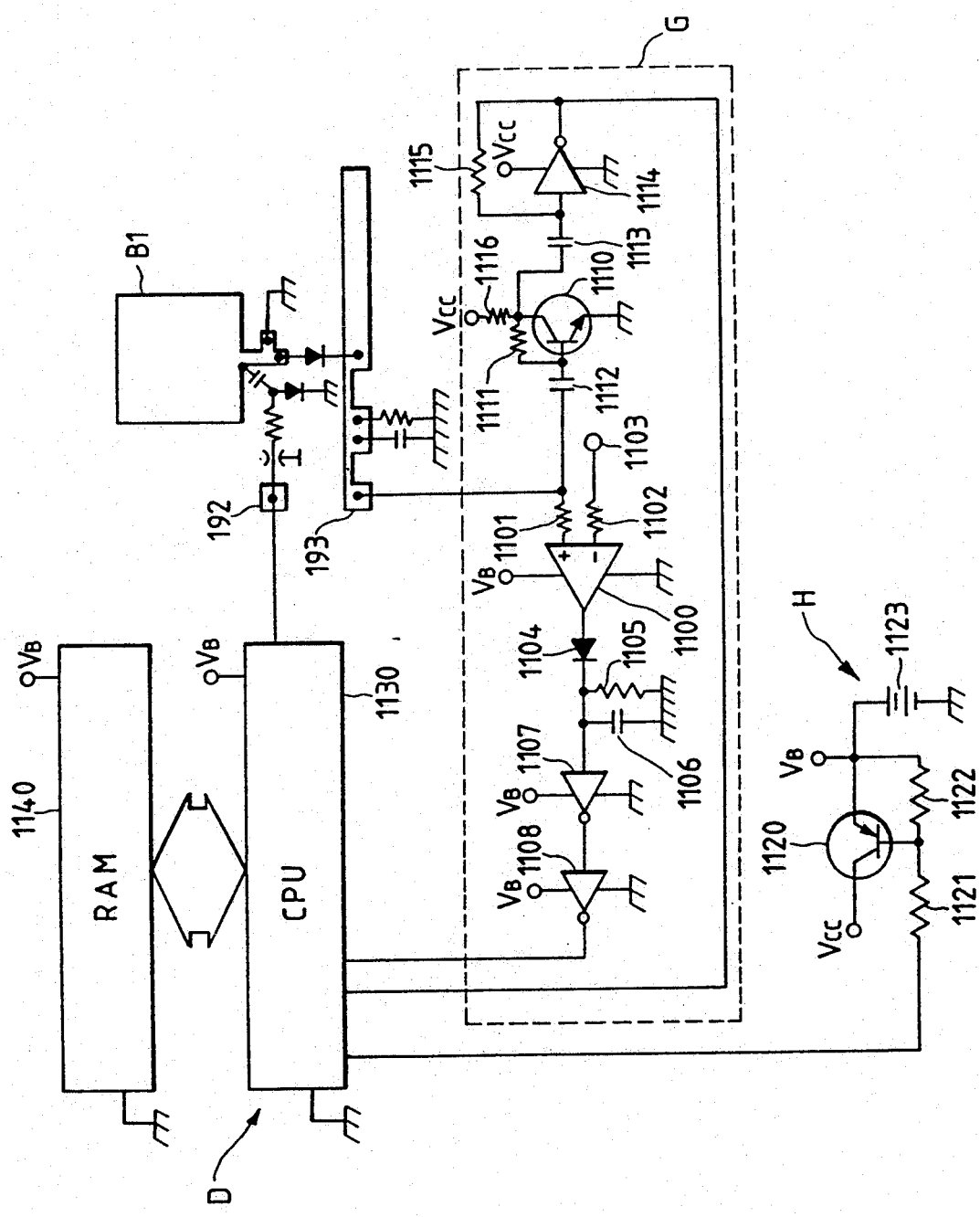
FIG. 17 is a diagram of a portion of the responder of FIG. 14 except the modulator and the detector.

As shown in FIG. 17, the detection terminal 193 is connected to a junction between a resistor 1101 and a capacitor 1112 within the judgment section G. The resistor 1101 is connected to the non-inverting input terminal of an operational amplifier 1100 within the judgment section G. For example, an IC chip "TLC271" made by Texas Instruments Incorporated can be used as this operational amplifier 1100. The capacitor 1112 is connected to the base of a transistor 1110 within the judgment section G.

The inverting input terminal of the operational amplifier 1100 receives a predetermined reference voltage from a terminal 1103 via a resistor 1102. The output terminal of the operational amplifier 1100 is connected to the input terminal of an inverter 1107 via a diode 1104. For example, an IC chip "74HC00" made by Texas Instruments Incorporated can be used as this inverter 1107. The cathode of the diode 1104 is grounded via a resistor 1105 and a capacitor 1106.

The output terminal of the inverter 1107 is connected to an input/output (I/O) port of a central processing unit (CPU) 1130 via an inverter 1108. For example, an IC chip "74HC00" made by Texas Instruments Incorporated can be used as this inverter 1108. A drive electric power is fed to the operational amplifier 1100 and the inverters 1107 and 1108 via a terminal $V_B$ directly coupled to a battery 1123. The reference voltage applied to the terminal 1103 is generated from the voltage at the terminal $V_B$.

A resistor 1111 is connected between the base and the collector of the transistor 1110. The emitter of the transistor 1110 is grounded. The collector of the transistor 1110 is connected to the input terminal of an inverter 1114 via a capacitor 1113. For example, an IC chip "74HC00" made by Texas Instruments Incorporated can be used as this inverter 1114. A resistor 1115 is connected between the input terminal and the output terminal of the inverter 1114. The output terminal of the inverter 1114 is connected to the I/O port of the CPU 1130. A drive electric power is fed to the transistor 1110 and the inverter 1114 via a terminal Vcc, which is connected to the battery 1123 via a transistor 1120.

A resistor 1122 is connected between the emitter and the base of the transistor 1120. The base of the transistor 1120 is connected to the I/O port of the CPU 1130 via a resistor 1121. The CPU 1130 is connected to a RAM 1140. The CPU 1130 and the RAM 1140 are connected to the battery 1123 via the terminal $V_B$.

When the antenna B1 receives an interrogation signal S1 from the interrogator A (see FIG. 14), an electric power proportional to the power of the received interrogation signal S1 is generated at the detection terminal 193. The level of the voltage (the detection output voltage level) generated at the detection terminal 193 is compared with the reference voltage by the operational amplifier 1100.

In the case where the detection level is higher than the reference level, the operational amplifier 1100 outputs a high-level signal. Thus, the inverter 1107 receives a voltage which equals the voltage of the output high-level signal from the operational amplifier minus a drop voltage across the diode 1104. The inverter 1107 judges the received voltage as a high level, and thus outputs a low-level signal to the inverter 1108. The inverter 1108 outputs a high-level signal in response to the input low-level signal. When the CPU 1130 receives the high-level signal from the inverter 1108, the CPU 1130 recognizes the reception of the interrogation signal S1 and outputs an active signal to the transistor 1120 via the resistor 1121 to make the transistor 1120 conductive. As a result, the transistor 1120 is made conductive so that a drive electric power is fed to the transistor 1110 and the inverter 1114 via the terminal Vcc. When activated by the drive electric power, the transistor 1110 and the inverter 1114 cooperate as an amplifier which amplifies a part of the detected components of the interrogation signal S1 (a part of the detection output signal) and which outputs the amplified detection signal to the CPU 1130. The CPU 1130 intermittently processes the input detection signal to extract information and mobile data (identification information data) from the input detection signal. Specifically, during a first period assigned to writing mobile data (identification information data) into the responder B, the CPU 1130 functions to write the mobile data into the RAM 1140. During a second period assigned to reading out mobile data, the CPU 1130 functions to read out the mobile data from the RAM 1140 and then drive the modulator E in response to the mobile data to transmit the mobile data to the interrogator A (see FIG. 14).

As understood from the previous description, a part of the power of a received interrogation signal S1 is used for detection while the remaining part of the power of the received interrogation signal S1 is used for modulation. Thus, the antenna B1 can be used in common for both transmission and reception so that the responder B can be compact.

The feed-through capacitor 191 prevents the leakage of an RF power from the modulator E to the CPU 1130 so that the CPU 1130 is protected from the RF power. In addition, the feed-through capacitor 191 separates the RF circuit part and the CPU 1130 so that the modulator E can be compact.

The detector F enables the identification information data in the RAM 1140 to be updated in accordance with information data contained in an interrogation signal S1.

In the absence of a received interrogation signal S1, since the detection level is smaller than the reference level, the judgment section G is suspended. Thus, even when noise radio waves are received by the antenna B1, wrong operation of the responder B is prevented.

Figure 21:
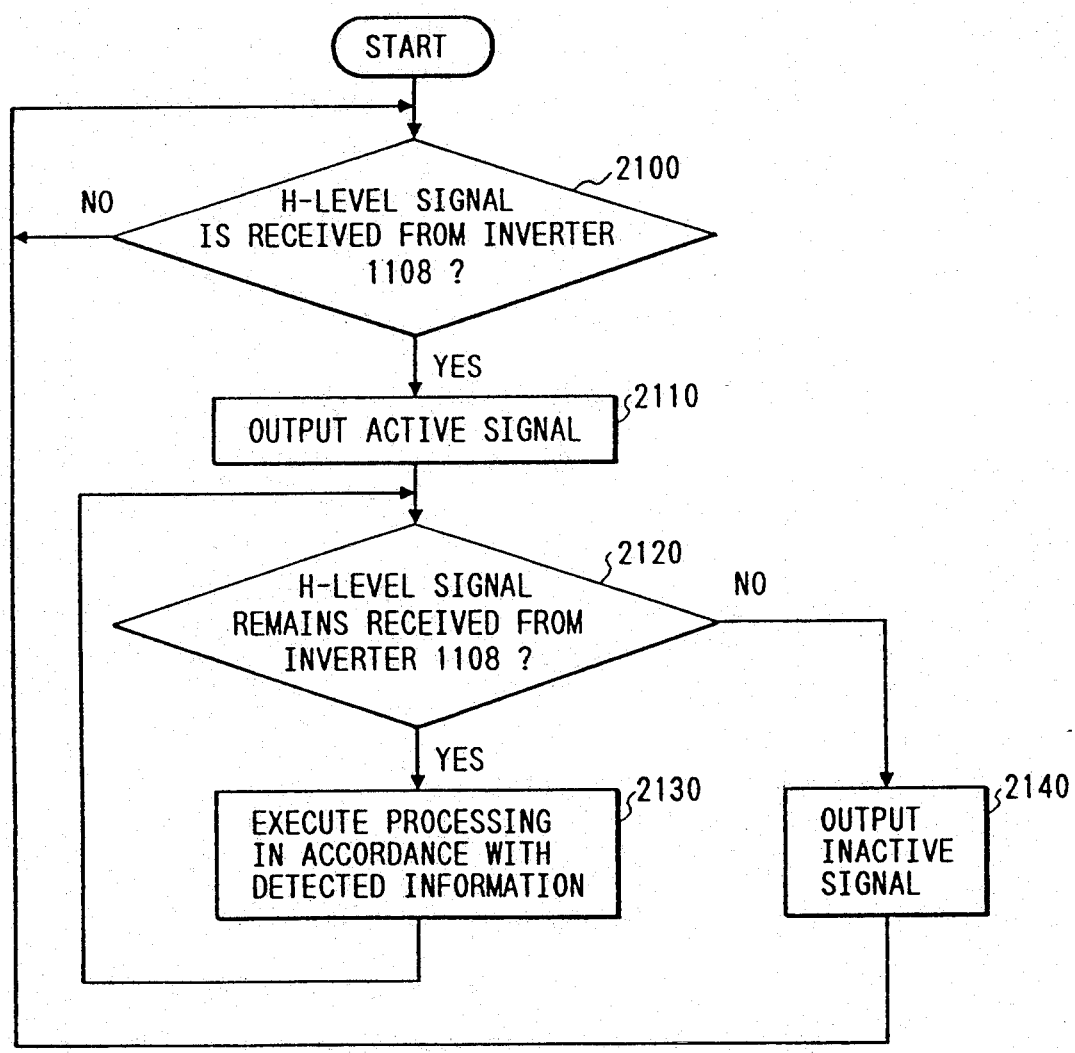
FIG. 21 is a flowchart of a program controlling the CPU of FIG. 17.

The CPU 1130 includes a combination of an I/O section, a ROM, a processing section, and a read/write memory. The CPU 1130 operates in accordance with a program stored in the ROM. FIG. 21 is a flowchart of this program.

As shown in FIG. 21, a first step 2100 of the program decides whether or not a high-level signal is received from the inverter 1108. When a high-level signal is received from the inverter 1108, the program advances to a step 2110. Otherwise, the first step 2100 is reiterated.

The step 2110 outputs an active signal to the transistor 1120 via the resistor 1121 so that the transistor 1120 is made conductive. After the step 2110, the program advances to a step 2120.

By the steps 2100 and 2110, the CPU 1130 recognizes the reception of an interrogation signal S1 from the interrogator A and accepts information of various instructions contained in the interrogation signal S1.

The step 2120 decides whether or not the high-level signal remains received from the inverter 1108. When the high-level signal remains received from the inverter 1108, the program advances to a step 2130. Otherwise, the program advances to a step 2140.

The step 2130 executes processing in accordance with the accepted information of the various instructions. For example, in the case where the accepted information represents an instruction of reading out mobile data, the step 2130 reads out mobile data from the RAM 1140 and activates the modulator E in response to the readout mobile data. After the step 2130, the program returns to the step 2120.

The step 2140 outputs an inactive signal to the transistor 1120 via the resistor 1121 so that the transistor 1120 is made non-conductive. After the step 2140, the program returns to the step 2100.

By the steps 2120-2140, the processing responsive to the information of the various instructions remains executed in the case where the interrogation signal S1 continues to be received from the interrogator A. On the other hand, when the reception of the interrogation signal S1 is interrupted, that is, when the output signal from the inverter 1108 changes to the low level, the step 2140 is executed and the acceptance of the information of the various instructions is suspended.

DESCRIPTION OF THE ELEVENTH PREFERRED EMBODIMENT

An eleventh embodiment of this invention is similar to the embodiment of FIGS. 14–17, and 21 except for a design change indicated hereinafter.

As shown in FIGS. 18 and 19, one side of a printed circuit board 195 in the eleventh embodiment is formed with an antenna B1, a micro-strip-line 182, a stub 183, and a micro-strip-line 184 while the other side of the printed circuit board 195 is provided with other circuit elements of a modulator E and a detector F. The antenna B1, the micro-strip-line 182, the stub 183, and the micro-strip-line 184 are connected to opposite-side related elements and an opposite-side ground region via through-holes.

DESCRIPTION OF THE TWELFTH PREFERRED EMBODIMENT

A twelfth embodiment of this invention is similar to the embodiment of FIGS. 14–17, and 21 except for a design change indicated hereinafter.

As shown in FIG. 20, an antenna B1 of a responder in the twelfth embodiment includes a micro-strip antenna 194 of a circularly-polarized wave separating type. A modulator E is connected to a point of the antenna 194 which is angularly separated from the point of the connection between the antenna 194 and a micro-strip-line 182 by an angular interval of 90°. Clockwise circularly-polarized wave of a received interrogation signal S1 is guided from the antenna 194 to a detector F, being subjected to a detection process. On the other hand, counterclockwise circularly polarized wave of a received interrogation signal S1 is guided from the antenna 194 to the modulator E, being subjected to a modulation process.

An interrogator (not shown) has two antennas for clockwise circularly-polarized wave and counterclockwise circularly-polarized wave respectively. Since the power of the clockwise circularly-polarized wave and the power of the counterclockwise circularly-polarized wave can be set independently, the power of an interrogation signal S1 can be efficiently used by the responder B.

What is claimed is:

1. In a movable-object identification system including an interrogator for transmitting an interrogation signal having a predetermined frequency, and a responder mounted on a movable object for transmitting a reply signal in response to the interrogation signal, the reply signal containing identification information, the responder comprising:
    an antenna for receiving the interrogation signal from the interrogator, and for radiating the reply signal;
    input means connected to the antenna for receiving an electric power of the interrogation signal received by the antenna, the input means including a receiving element for dividing the received electric power into a first separation electric power and a second separation electric power corresponding to a traveling wave and reflected wave of the interrogation signal, respectively, the receiving element having an impedance which determines a ratio between the first separation electric power and the second separation electric power;
    generating means for generating predetermined identification information based on the first separation electric power; and
    modulating means, connected in parallel with the input means and connected to the antenna, for varying the impedance of the receiving element in accordance with the predetermined identification information, for modulating the second separation electric power of the interrogation signal in accordance with the identification information to generate the reply signal, and for feeding the reply signal to the antenna, wherein the reply signal has a carrier which corresponds to the second separation electric power of the interrogation signal, and a frequency of the carrier of the reply signal is equal to the predetermined frequency.

2. The responder of claim 1 wherein the input means comprises rectifying means including a rectifying element for dividing the received electric power into the first and second separation electric powers at a ratio depending on a reflection coefficient of the rectifying element, and for rectifying the first separation electric power into a dc power which powers the generating means.

3. In a movable-object identification system including an interrogator for transmitting an interrogation signal, and a responder mounted on a movable object for transmitting a reply signal in response to the interrogation signal, the reply signal containing identification information, the responder comprising:
    an antenna for receiving the interrogation signal from the interrogator, and for radiating the reply signal;
    input means connected to the antenna for receiving an electric power of the interrogation signal received by the antenna, the input means including a receiving element for dividing the received electric power into a first separation electric power and a second separation electric power corresponding to a traveling wave and reflected wave of the interrogation signal, respectively, the receiving element having an impedance;
    generating means for generating predetermined identification information based on the first separation electric power; and
    modulating means, connected in parallel with the input means and connected to the antenna, for varying the impedance of the receiving element in accordance with the generated predetermined identification information, for modulating the second separation electric power of the interrogation signal in accordance with the identification information to generate the reply signal, and for feeding the reply signal to the antenna;
    wherein the input means comprises detecting means including a detecting element for dividing the received electric power into the first and second separation electric powers at a ratio depending on a reflection coefficient of the detecting element, and judgment means for outputting a transmission instruction signal to the generating means when a voltage level of the first separation electric power is equal to or greater than a predetermined reference level;
    wherein the modulating means comprises means for varying the reflection coefficient of the detecting element in accordance with the identification information generated by the generating means, for modulating the second separation electric power in accordance with the identification information to generate the reply signal, and for feeding the reply signal to the antenna;

and wherein the generating means comprises means for outputting the identification information to the modulating means in response to the transmission instruction signal from the judgment means.

4. In a movable-object identification system including an interrogator for transmitting an interrogation signal having a predetermined frequency, and a responder mounted on a movable object for transmitting a reply signal in response to the interrogation signal, the reply signal containing identification information, the responder comprising:

an antenna for receiving the interrogation signal from the interrogator, and for radiating the reply signal;

power distributing means for dividing an electric power of the interrogation signal received by the antenna into first and second separation electric powers, and for rectifying the second separation electric power into a dc power; and generating means, powered by the dc power from the power distributing means, for generating predetermined identification information; and the power distributing means being operative to modulate the first separation electric power of the interrogation signal in accordance with the identification information generated by the generating means to generate the reply signal, and to feed the reply signal to the antenna, wherein the reply signal has a carrier which corresponds to the first separation electric power of the interrogation signal, and a frequency of the carrier of the reply signal is equal to the predetermined frequency.

5. The responder of claim 4 wherein the power distributing means comprises:

rectifying means for rectifying the second separation electric power into the dc power, the rectifying means having a first impedance; and modulating means for modulating the first separation electric power of the interrogation signal in accordance with the identification information generated by the generating means, the modulating means having a second impedance, the modulating means comprising means for dividing the received electric power into the first and second separation electric powers at a ratio depending on the first and second impedances, and means for varying the first impedance in accordance with the identification information to modulate the first separation electric power of the interrogation signal in accordance with the identification information.

6. The responder of claim 4 wherein the power distributing means comprises:

rectifying means including a rectifying element for dividing the received electric power into the first and second separation electric powers at a ratio depending on a reflection coefficient of the rectifying element, and for rectifying the second separation electric power into the dc power; and modulating means for varying the reflection coefficient of the rectifying element in accordance with the identification information to modulate the first separation electric power of the interrogation signal in accordance with the identification information.

7. The responder of claim 4 wherein the power distributing means comprises:

distributing means for dividing the received electric power of the interrogation signal into the first and second separation electric powers;

rectifying means for rectifying the second separation electric power into the dc power; and modulating means for modulating the first separation electric power of the interrogation signal in accordance with the identification information generated by the generating means.

8. The responder of claim 4 further comprising demodulating means for deriving a demodulation signal from the received interrogation signal.

9. In a movable-object identification system including an interrogator for transmitting an interrogation signal having a predetermined frequency, and a responder mounted on a movable object for transmitting a reply signal in response to the interrogation signal, the reply signal containing identification information, the responder comprising:

an antenna for receiving the interrogation signal, and for radiating the reply signal;

a branch connected to the antenna for dividing the interrogation signal received by the antenna into two parts;

a rectifier connected to the branch for converting the first part of the interrogation signal into a dc power;

a signal generator connected to the rectifier and powered by the dc power for generating an identification signal; and a modulator connected to the branch and the signal generator for modulating the second part of the interrogation signal in accordance with the identification signal to convert the second part of the interrogation signal into the reply signal, and for outputting the reply signal to the antenna via the branch, wherein the reply signal has a carrier which corresponds to the second part of the interrogation signal, and a frequency of the carrier of the reply signal is equal to the predetermined frequency.

10. In a movable-object identification system including an interrogator for transmitting an interrogation signal, and a responder mounted on a movable object for transmitting a reply signal in response to the interrogation signal, the reply signal containing identification information, the responder comprising:

an antenna for receiving the interrogation signal, and for radiating the reply signal;

a branch connected to the antenna for dividing the interrogation signal received by the antenna into two parts;

a rectifier connected to the branch for converting the first part of the interrogation signal into a dc power;

a signal generator connected to the rectifier and powered by the dc power for generating an identification signal; and a modulator connected to the branch and the signal generator for modulating the second part of the interrogation signal in accordance with the identification signal to convert the second part of the interrogation signal into the reply signal, and for outputting the reply signal to the antenna via the branch;

wherein the rectifier and the modulator comprise a common diode, and the modulator comprises a resistor and means for selectively connecting and disconnecting the resistor in parallel to and from the diode in accordance with the identification signal.

11. In a movable-object identification system including an interrogator for transmitting an interrogation signal having a predetermined frequency, and a responder mounted on a movable object for transmitting a reply signal in response to the interrogation signal, the reply signal containing identification information, the responder comprising:

an antenna for receiving the interrogation signal from the interrogator, and for radiating the reply signal;

means for accepting the received interrogation signal from the antenna, for reflecting a portion of the accepted interrogation signal toward the antenna based on a variable reflection coefficient, and for dividing the interrogation signal received by the antenna into a travelling wave and a reflected wave at a variable dividing ratio based on the variable reflection coefficient;

means for generating predetermined identification information based on the travelling wave; and means for varying the variable reflection coefficient and the variable dividing ratio in accordance with the predetermined identification information, for modulating the reflected wave in accordance with the predetermined identification information to convert the reflected wave into the reply signal, and for feeding the reply signal to the antenna, wherein the reply signal has a carrier which corresponds to the reflected wave, and a frequency of the carrier of the reply signal is equal to the predetermined frequency.

12. The responder of claim 11, further comprising means for converting the travelling wave into a dc power, and means for powering the generating means using the dc power.

13. In a movable-object identification system including an interrogator for transmitting an interrogation signal having a predetermined frequency, and a responder mounted on a movable object for transmitting a reply signal in response to the interrogation signal, the reply signal containing identification information, the responder comprising:

an antenna for receiving the interrogation signal from the interrogator, and for radiating the reply signal;

means for dividing the interrogation signal received by the antenna into a traveling wave and a reflected wave based on a variable dividing ratio;

means for generating predetermined identification information based on the travelling wave; and means for varying the variable dividing ratio which causes modulation of the reflected wave in accordance with the predetermined identification information and converts the reflected wave into the reply signal, and for feeding the reply signal to the antenna, wherein the reply signal has a carrier which corresponds to the reflected wave, and a frequency of the carrier of the reply signal is equal to the predetermined frequency.

14. The responder of claim 13, further comprising means for converting the travelling wave into a dc power, and means for powering the generating means using the dc power.

* * * * *